Figure 1:
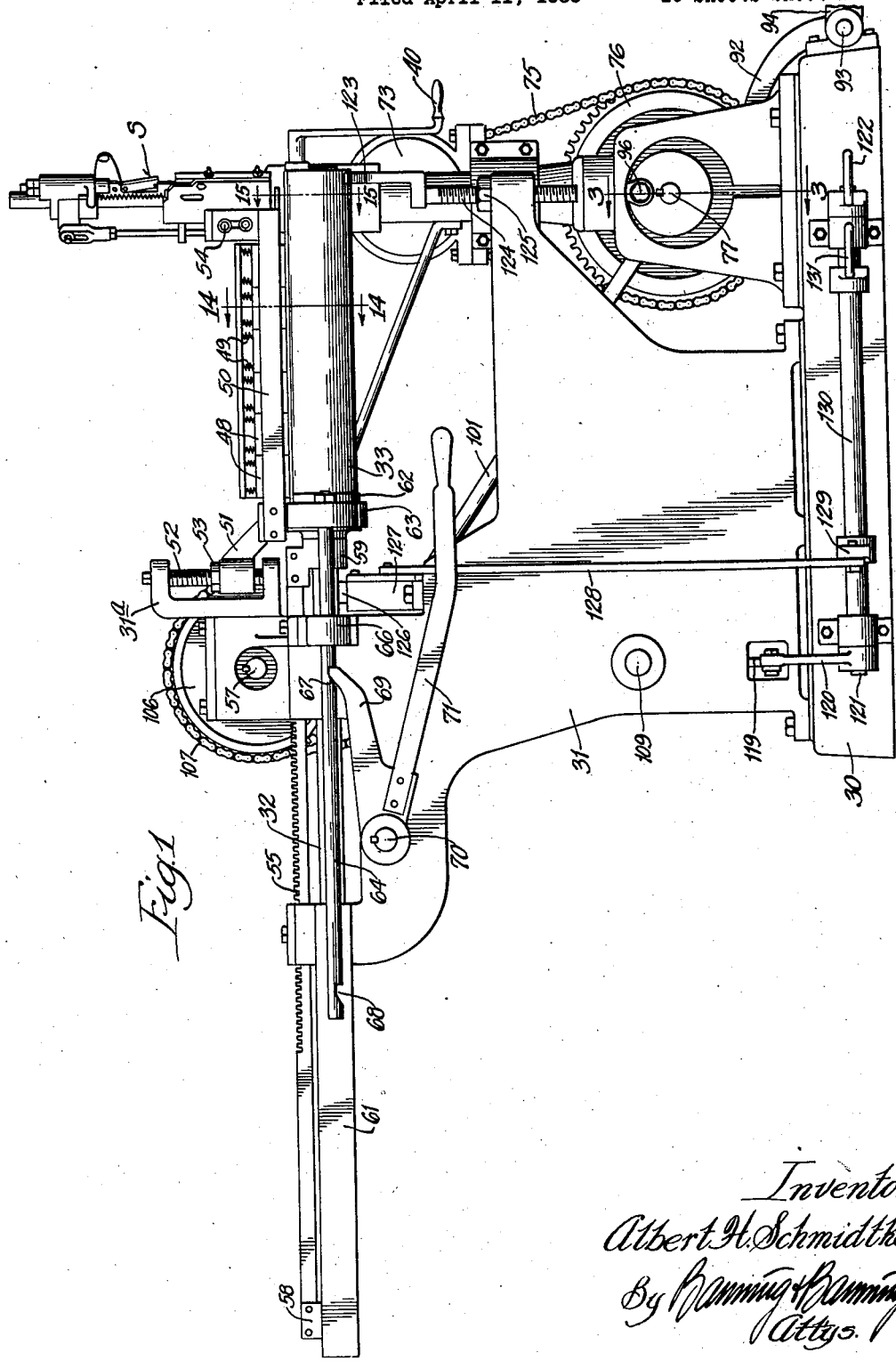

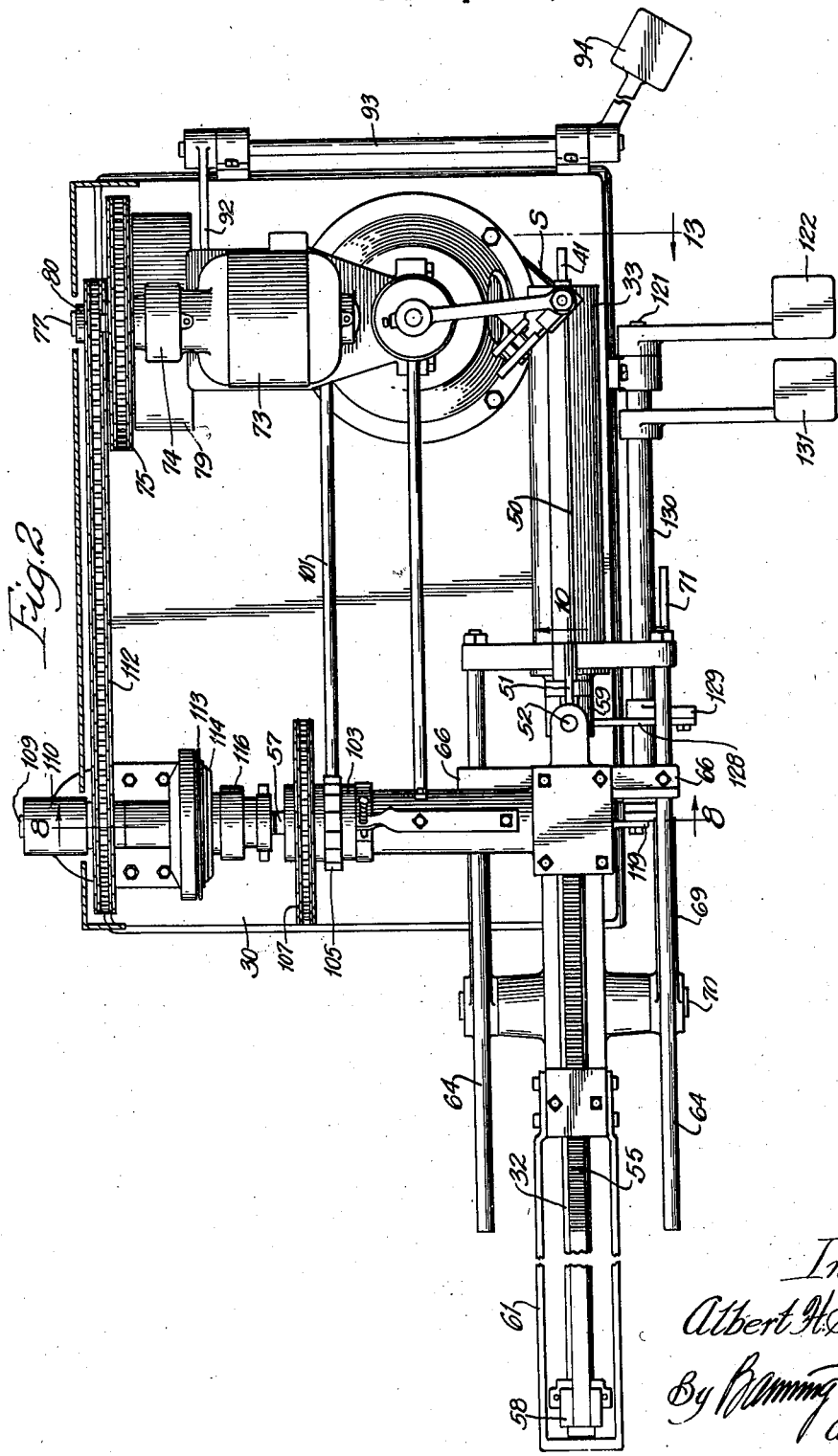

Oct. 20, 1936. A. H. SCHMIDTKE 2,058,182
MACHINE FOR FORMING CYLINDRICAL CONTAINERS
Filed April 11, 1935 10 Sheets-Sheet 3
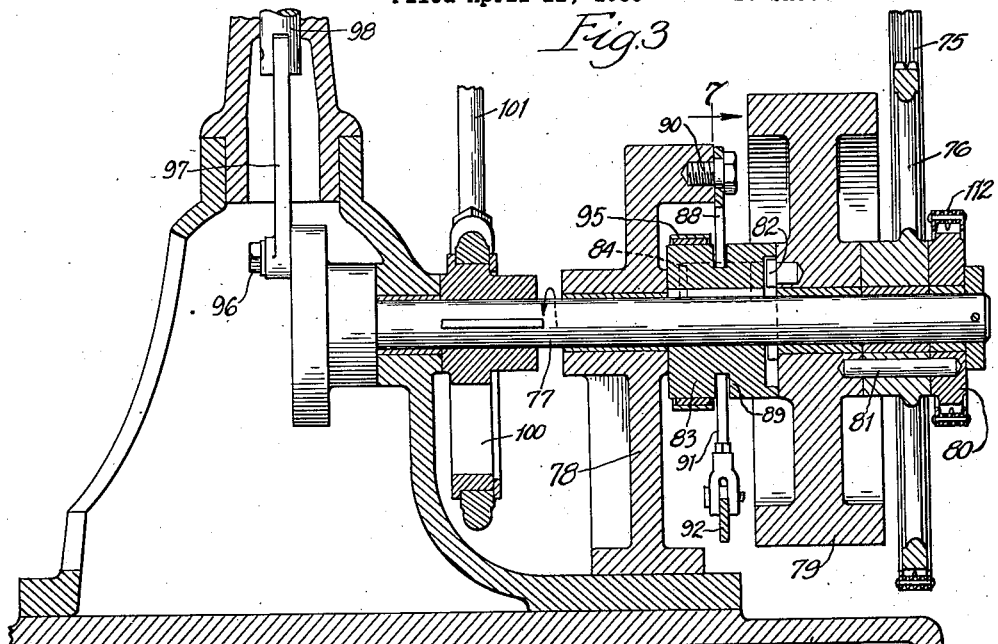
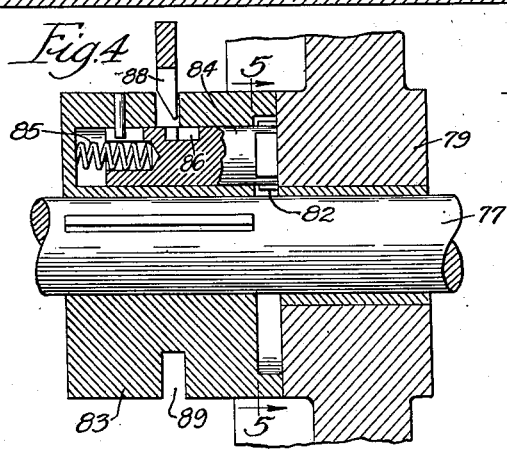
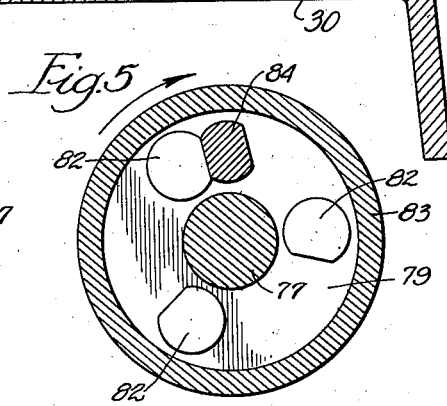
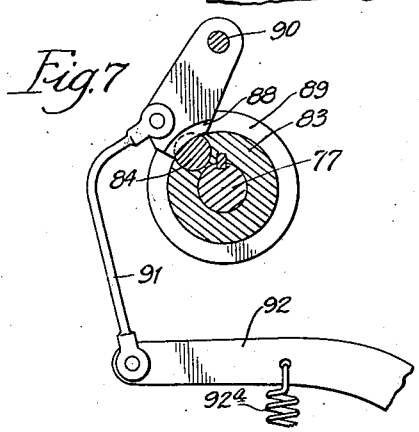
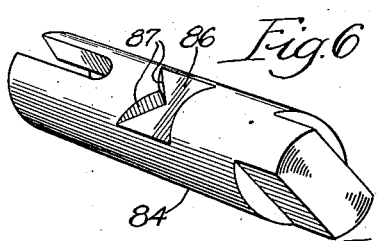
Inventor:
Albert H. Schmidtke,
By Banning & Banning
Attys.

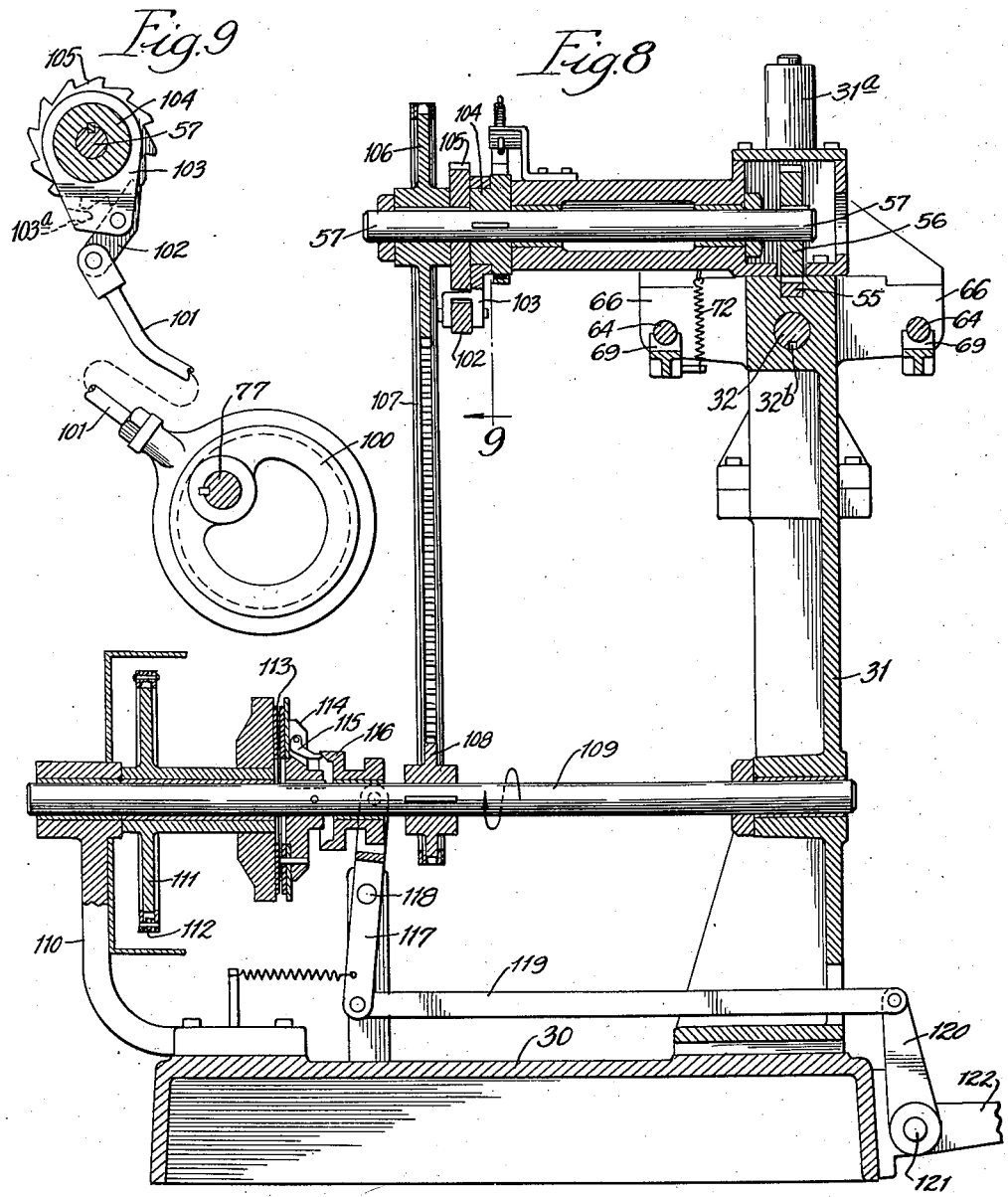

Oct. 20, 1936.　　A. H. SCHMIDTKE　　2,058,182
MACHINE FOR FORMING CYLINDRICAL CONTAINERS
Filed April 11, 1935　　10 Sheets-Sheet 5
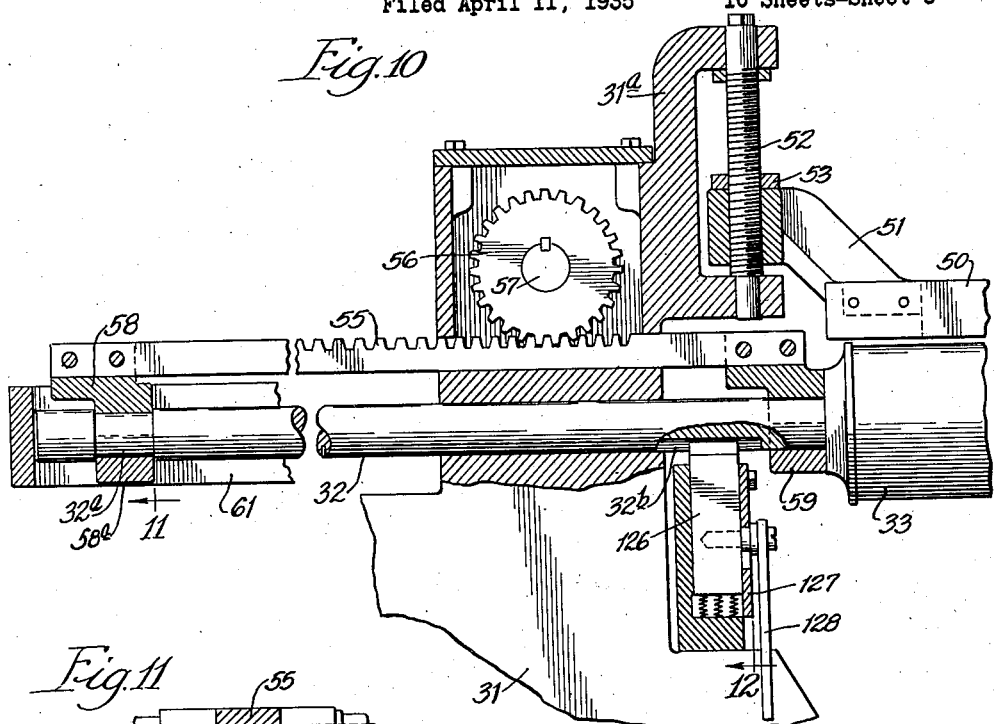
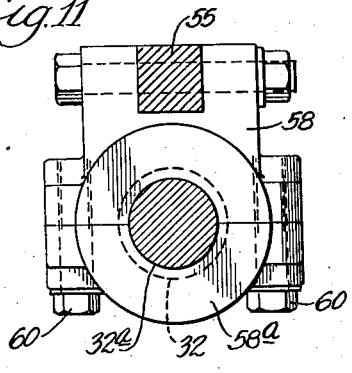
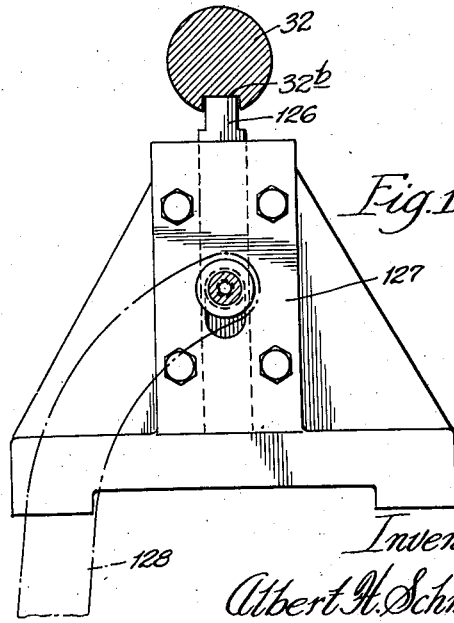
Inventor:
Albert H. Schmidtke,
By Banning & Banning
Attys.

Oct. 20, 1936.  A. H. SCHMIDTKE  2,058,182
MACHINE FOR FORMING CYLINDRICAL CONTAINERS
Filed April 11, 1935   10 Sheets-Sheet 6
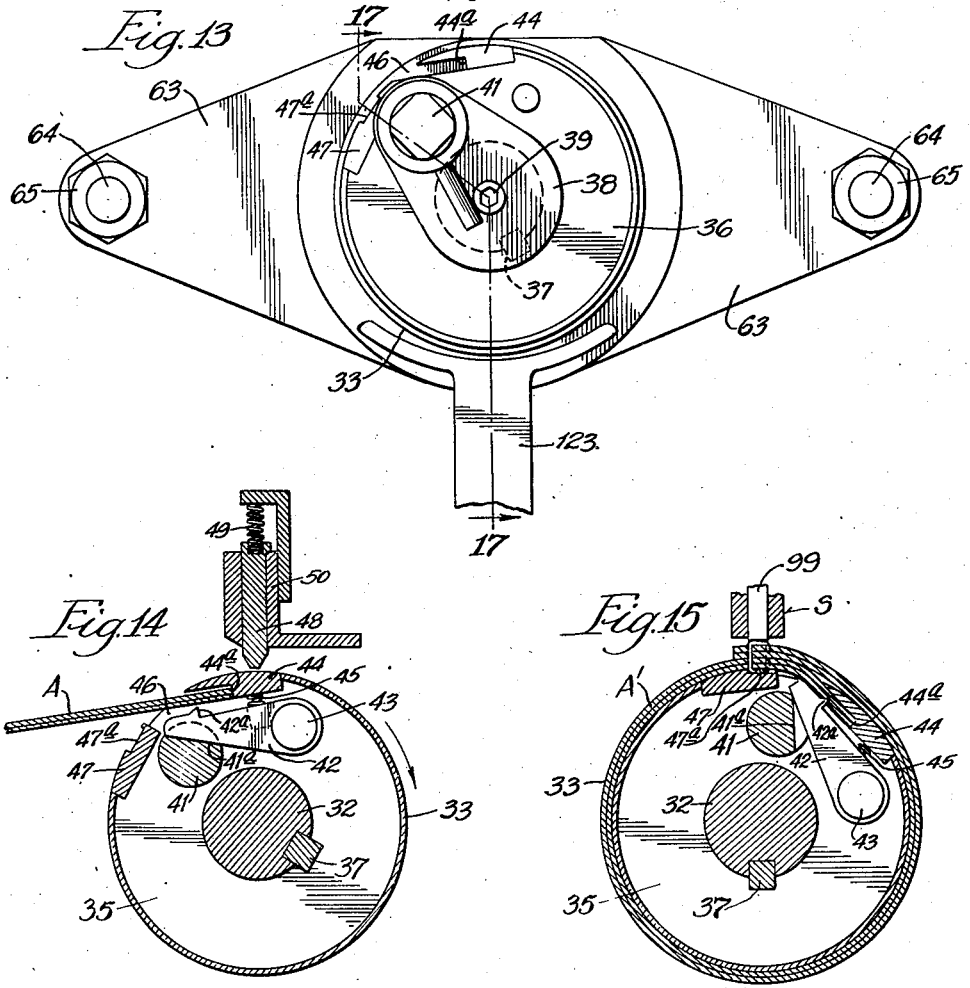
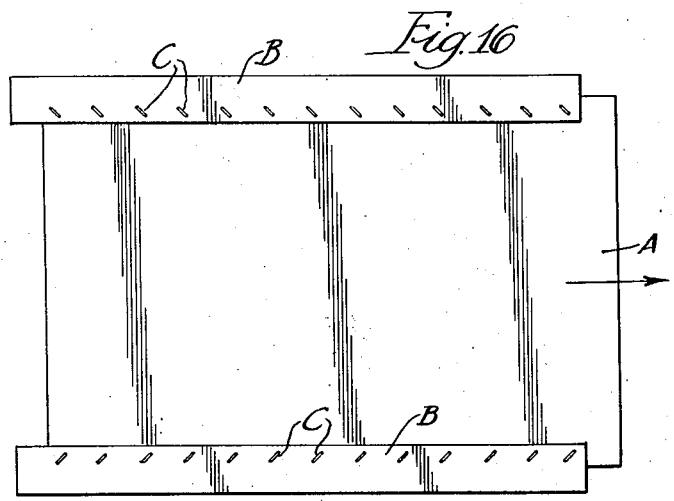
Inventor:
Albert H. Schmidtke,
By Banning & Banning
Attys.

Oct. 20, 1936.   A. H. SCHMIDTKE   2,058,182
MACHINE FOR FORMING CYLINDRICAL CONTAINERS
Filed April 11, 1935   10 Sheets-Sheet 7
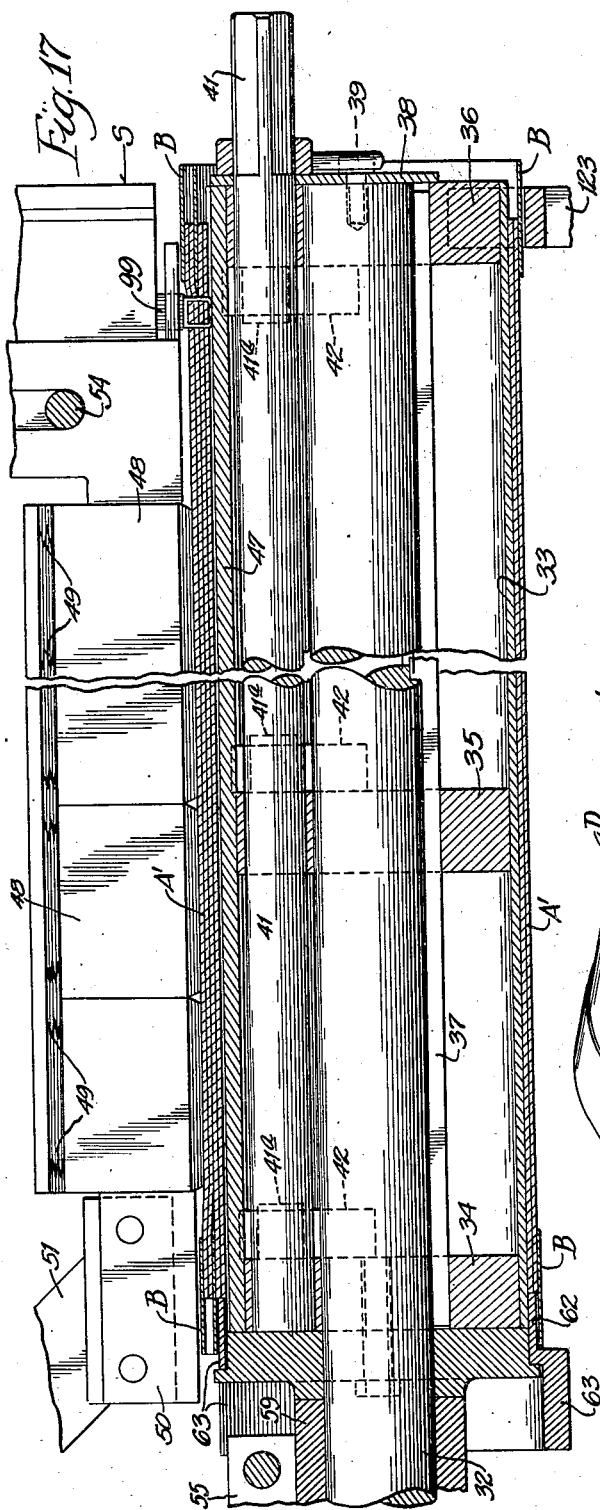
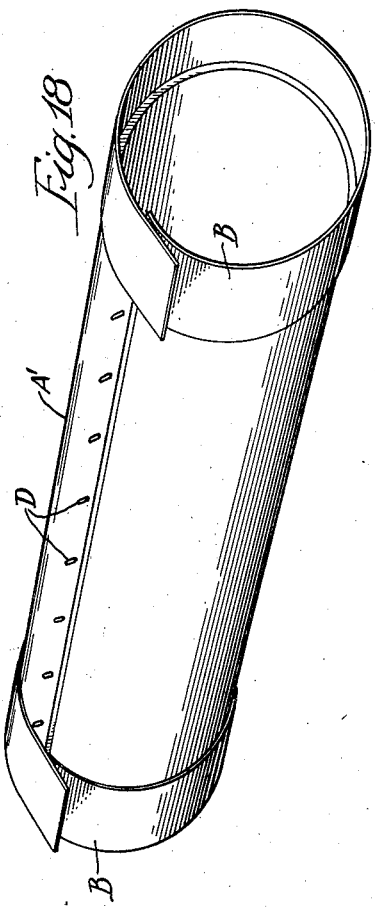
Inventor:
Albert H. Schmidtke,
By Banning & Banning
Attys.

Oct. 20, 1936.  A. H. SCHMIDTKE  2,058,182
MACHINE FOR FORMING CYLINDRICAL CONTAINERS
Filed April 11, 1935    10 Sheets-Sheet 8
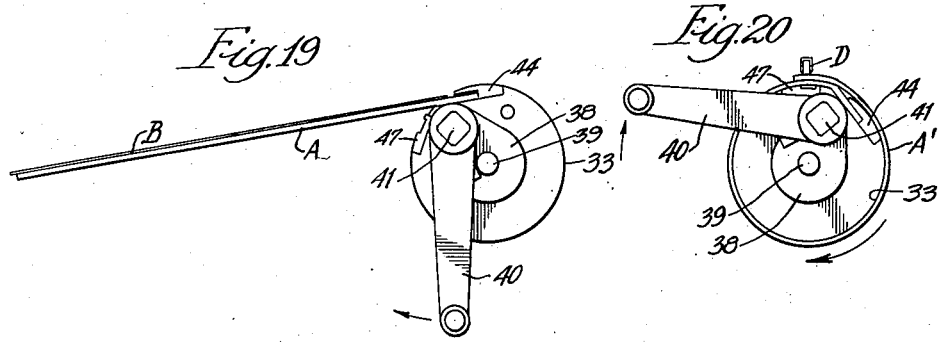
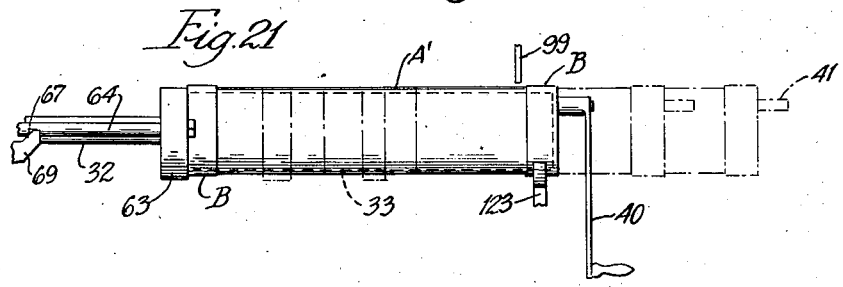
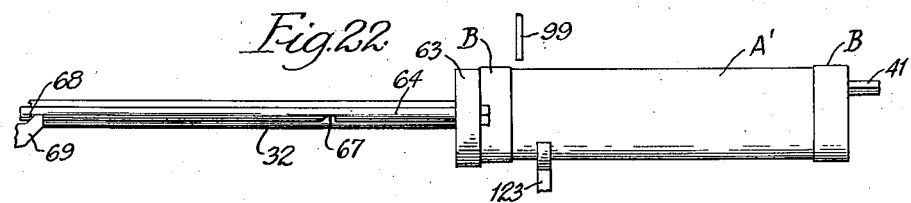
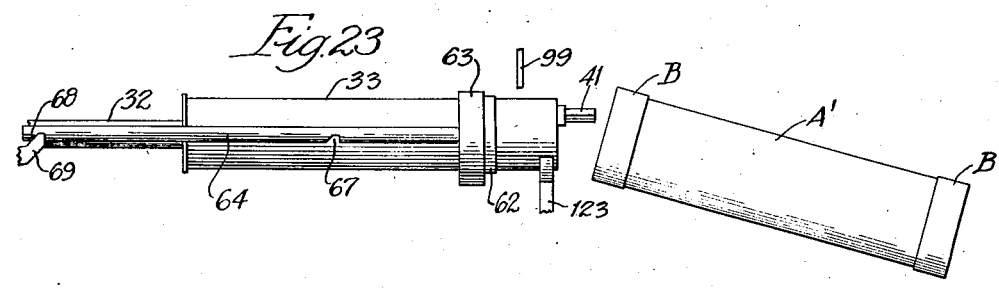
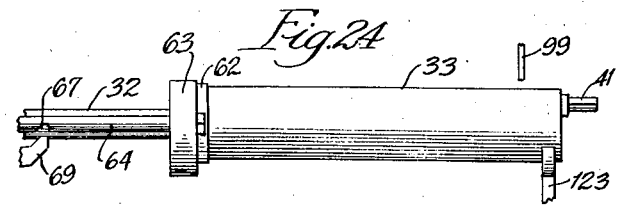
Inventor:
Albert H. Schmidtke,
By Banning & Banning
Attys.

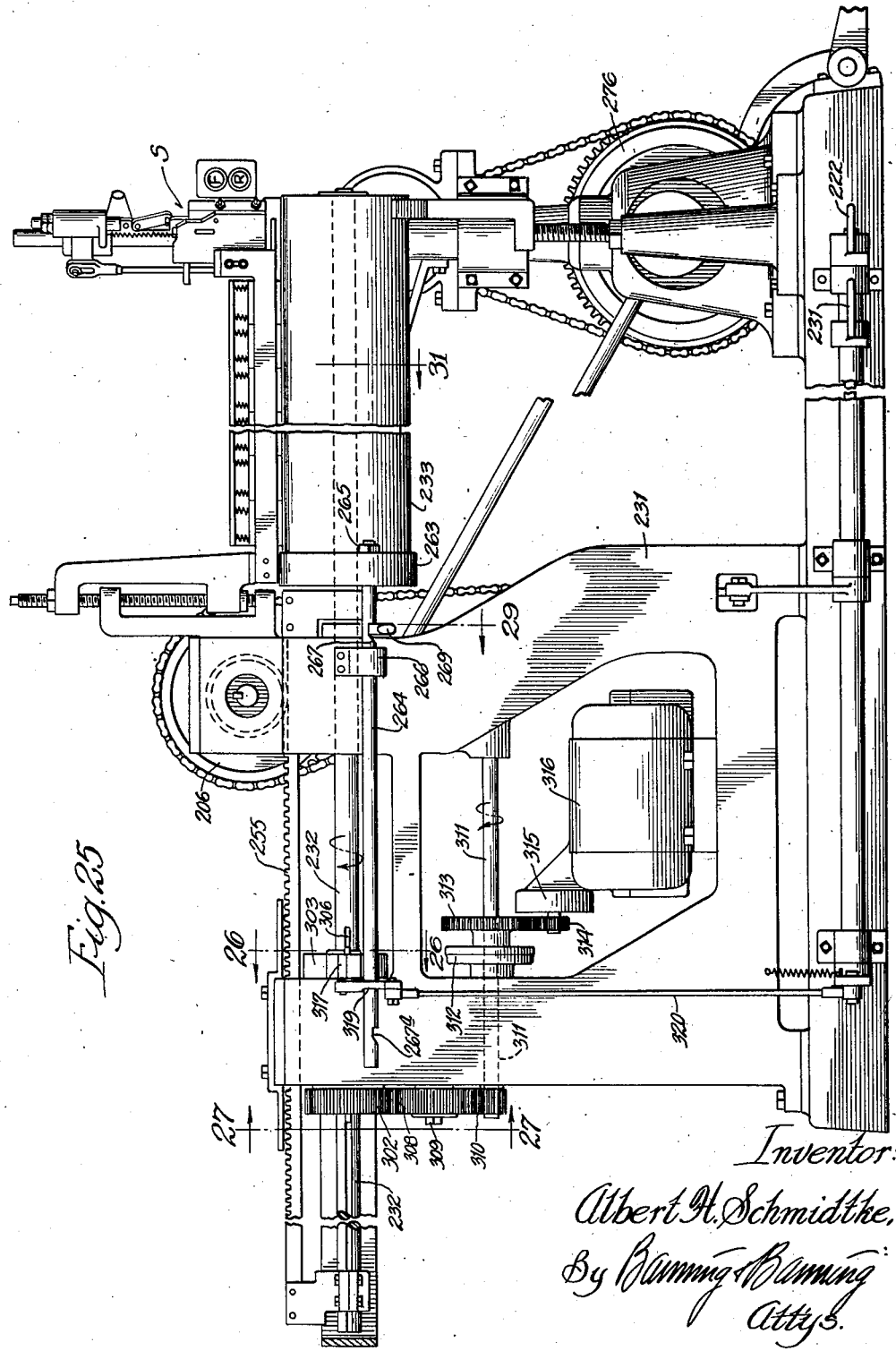

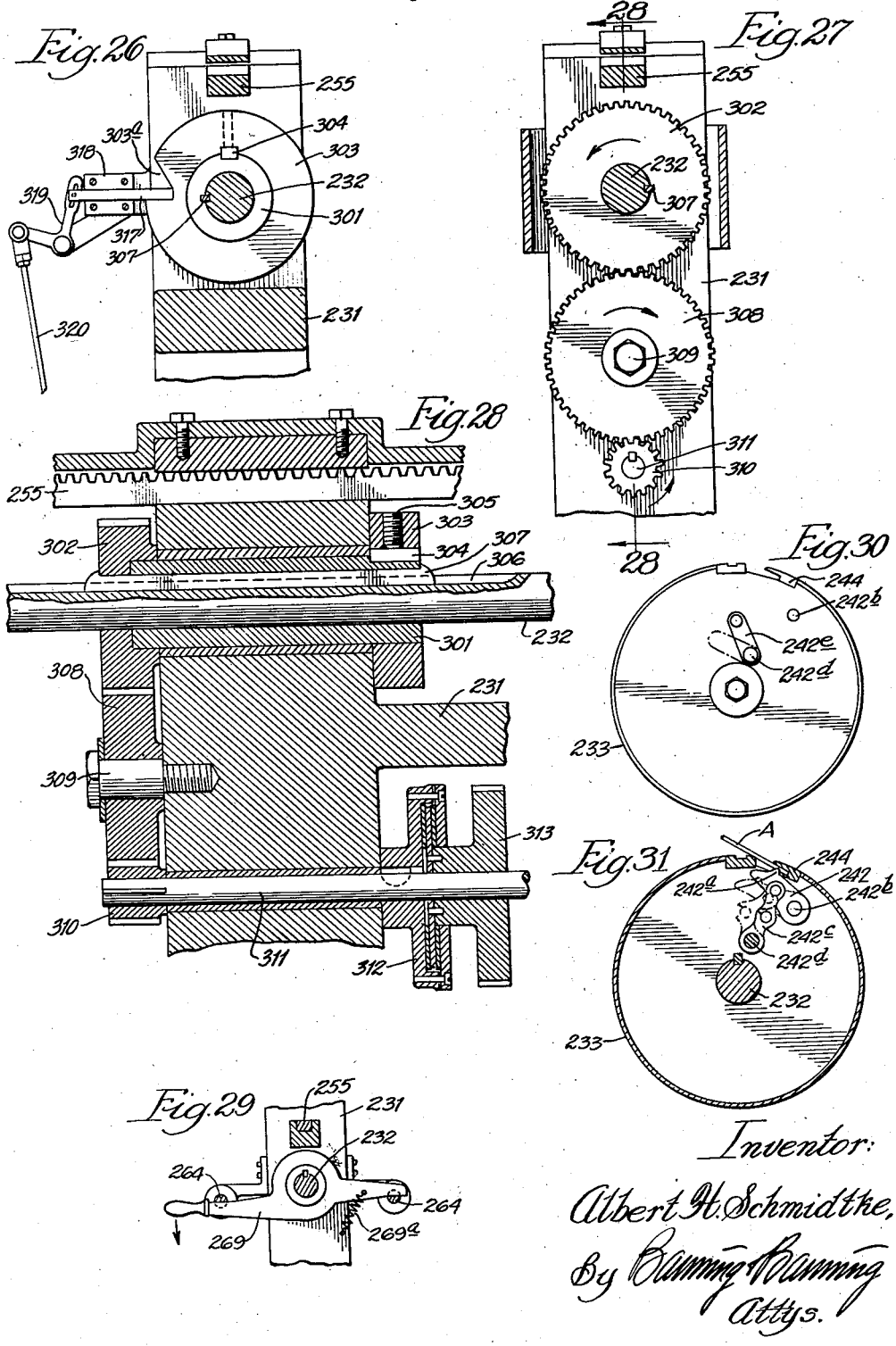

Patented Oct. 20, 1936

2,058,182

UNITED STATES PATENT OFFICE 2,058,182

MACHINE FOR FORMING CYLINDRICAL CONTAINERS

Albert H. Schmidtke, St. Joseph, Mich., assignor, by mesne assignments, to Seymour & Peck Company, Chicago, Ill., a corporation of Delaware Application April 11, 1935, Serial No. 15,785

10 Claims. (Cl. 93—81)

An object of this invention is to provide mechanism for rapidly and efficiently forming cylindrical containers from sheet material, and for riveting or stapling the overlapping ends.

This and other objects, as will hereinafter appear, are accomplished by this invention which is fully described in the following specification and shown in the accompanying drawings, in which—

Figure 1 is a front elevation of the machine;
Fig. 2 is a top plan view of the same;
Fig. 3 is a partial vertical section on the line 3—3 of Fig. 1;
Fig. 4 is a partial enlarged sectional view of the clutch of Fig. 3;
Fig. 5 is a transverse section on the line 5—5 of Fig. 4;
Fig. 6 is an enlarged perspective of the locking plunger of Fig. 4;
Fig. 7 is a partial sectional view on the line 7 of Fig. 3;
Fig. 8 is an enlarged vertical section on the line 8—8 of Fig. 2;
Fig. 9 is a vertical section on the line 9 of Fig. 8;
Fig. 10 is an enlarged vertical section on the line 10 of Fig. 2;
Fig. 11 is an enlarged transverse section on the line 11 of Fig. 10;
Fig. 12 is a partial enlarged vertical section on the line 12 of Fig. 10;
Fig. 13 is an enlarged end elevation as viewed on the line 13 of Fig. 2;
Figs. 14 and 15 are enlarged vertical sections on the lines 14—14 of Fig. 1 showing the drum at the beginning and end of the cylinder forming operation respectively;
Fig. 16 is a developed view of a plywood sheet from which the cylinder may be formed;
Fig. 17 is a longitudinal section on the broken line 17—17 of Fig. 13;
Fig. 18 is a perspective view of the cylinder after being formed by this machine;
Fig. 19 is an end elevation of the drum showing the plywood strip inserted prior to the bending operation;
Fig. 20 is the same showing the plywood strip wound about the drum and ready for the application of the staples;
Fig. 21 is a side elevation of the drum with the strip wound thereon showing the drum in various positions during the stapling operations;
Fig. 22 is the same showing the drum at the extreme outermost position during and following the last stapling operation;

Fig. 23 is the same showing the drum retracted and the cylinder removed;
Fig. 24 is a similar view showing the stripper retracted;
Fig. 25 is a front elevation of a modified form of the machine;
Figs. 26 and 27 are partial enlarged vertical sections on lines 26—26 and 27—27 of Fig. 26;
Fig. 28 is a vertical section on the line 28—28 of Fig. 27;
Fig. 29 is a partial enlarged section on the line 29 of Fig. 25;
Fig. 30 is an enlarged end view of the mandrel of Fig. 25; and
Fig. 31 is a partial enlarged section on the line 31 of Fig. 25.

The machine as illustrated takes a flat rectangular panel A of sheet material such as plywood (Fig. 16) having a metal strip B at each side secured thereto by means of staples or the like C, and rolls this into a cylindrical form, the edges of the plywood panel A overlapping. While so held in this overlapping relation in the machine the overlapping edges are permanently secured together by means of a series of staples D (Fig. 18). The cylindrical container shown in Fig. 18 is then stripped from the mandrel on which it was formed. The overlapping ends of the metal strips B are then secured as by spotwelding in a later operation. The present machine leaves the container in the form shown in Fig. 18.

The embodiment illustrated comprises a machine having a base 30 on which is secured a main frame 31 in which is journaled a shaft 32 carrying at the right-hand end a mandrel 33 about which the cylindrical container is formed, as will later be described. This mandrel is mounted on the shaft by means of spider members 34, 35, 36 (Fig. 17) which are secured to the shaft 32 by means of a key 37, the whole being held in place by means of a plate 38 and a screw 39.

The shaft 32 and the mandrel 33 are manually rotatable by means of a crank 40 (Fig. 1) which is applied to the squared end of a shaft 41 (Fig. 17) which is journaled in the spider members 34, 35, 36, and has flattened surfaces 41ᵃ against which bear gripping levers 42 hingedly mounted on pins 43 on the sides of the members 34, 35, 36. These gripping levers lie under an arcuate gripping plate 44 which extends throughout the length of the mandrel and of substantially the same outer diameter, each gripping lever being normally pressed against the shaft 41 by means of a spring 45. Parallel to the gripping plate 44 and spaced therefrom so as to form a longitudinal opening 46 is a stapling anvil 47 which is also substantially arcuate, but which has a longitudinal depression 47ª adapted to receive the staples, as will later be explained. The upper side of the gripping lever 42 has a gripping tooth 42ª.

As the shaft 41 is turned by movement of the crank 40, the lever 42 is forced outwardly toward the gripping plate 44, and the forward edge of a panel A of plywood or the like placed between the gripping teeth 42ª and the gripping plate 44 and against the shoulder 44ª will thus be gripped. As the crank 40 continues to move the mandrel in a clockwise direction, as viewed in Fig. 14, it drags the plywood panel A around with it, and as it does so it passes under a series of pressure feet 48 which are pressed toward the mandrel by means of springs 49 and are slidable in guides 50, which are carried at the left-hand end by means of a bracket 51 which is adjustably held (Fig. 10) on a screw 52 by means of a lock nut 53. The screw 52 is carried by means of an arm 31ª of the frame 31. The right-hand end of the guides 50 is adjustably secured by means of set screws 54 to a suitable support. Thus the guides 50 may be adjusted up and down to accommodate mandrels of various sizes.

The shaft 32 and mandrel 33 are movable back and forth by means of a rack 55 and pinion 56 on a shaft 57 (Fig. 10). The rack 55 is secured to the shaft 32 by means of collars 58, 59, the collar 58 being smaller than the shaft 32 and let into a restricted portion 32ª thereof, each of the collars being provided with a lower half as 58ª (Fig. 11) which is secured to the upper half by means of cap screws 60. Thus a movement of the pinion 56 is transmitted through the rack 55 to the mandrel 33. A guard 61 surrounds the protruding end of the shaft 32 and is secured to the frame 31. Mechanism for driving the pinion 56 both forward and back will later be described.

The mechanism for stripping the cylindrical shell A' from the mandrel comprises a sleeve 62 (Fig. 17) which surrounds the mandrel, and is carried by a yoke 63 (Fig. 13) which has a guide rod 64 secured thereto at each side by means of a nut 65. This guide rod passes through suitable guides 66, each guide rod having a forward notch 67 and a rear notch 68 (Fig. 1) for the reception of a retaining pawl 69 which is operable about a shaft 70 by means of a hand lever 71 and normally held in an upper position by means of a spring 72. The sleeve 62 forms a shoulder against which the shell A' bears for positioning it longitudinally on the mandrel, the shell having a metal strip overlapping the sleeve 62. Thus it will be seen that the stripping mechanism can move to the right with the mandrel 33, but that when the mandrel reaches its furthermost position to the right, as shown in Fig. 22, the retaining pawl 69 will engage the rear notch 68 so that as the mandrel is retracted, as shown in Fig. 23, the stripper yoke 63 and the sleeve 62 will cause the shell A' to be forced off the mandrel. The mechanism for performing these operations will later be described.

A motor 73 serves to drive this machine and it acts through a suitable gear reduction 74 and a silent chain 75 to drive a gear 76 (Fig. 3) journaled on a shaft 77 which is suitably journaled in standards 78 carried by the base 30. The gear 76 is secured to a fly wheel 79 and a sprocket 80 by means of a pin 81, so that these members all rotate together about the shaft 77. The fly wheel 79 is provided with a series of pins 82, preferably three in number, as shown in Figs. 4 and 5. A clutch body 83 keyed to the shaft 77 is provided with a plunger 84 which is movable back and forth parallel to the shaft 77 and is normally urged toward the fly wheel 79 by means of a spring 85. This plunger has a transverse slot 86 formed in one side, the slot having inclined faces 87 at the rear which are adapted to engage a clutch finger 88 which is adapted to enter an annular groove 89 in the clutch body 83. The finger 88 is movable about a pin 90, and is movable up and down by means of a link 91 which is pivotally connected to a lever arm 92 (Fig. 2) which in turn is carried by a shaft 93 which is rotatable by means of a stapling pedal 94.

The lever 92 is normally held in the position shown in Fig. 7 by means of a spring 92ª, and in this position the finger 88 lies in the notch 86 and holds the plunger 84 retracted so that the shaft 77 and clutch body 83 are stationary while the fly wheel 79 is in rotation. On depressing the stapling pedal 94 the finger 88 is raised, as shown in Fig. 4, and the plunger 84 is then forced toward the fly wheel 79 and engages one of the pins 82, as shown in Fig. 5, thereby causing the fly wheel to drive the shaft 77. Upon releasing the pedal 94 the spring 92ª again returns the finger 88 to the position of Fig. 7 and the plunger 84 is retracted. To assist in bringing the shaft 77 and its associated parts to a sudden stop, the clutch body 83 is provided with a friction brake band 95 (Fig. 3) which is secured to the standard 78.

The shaft 77 carries a crank disk upon which is mounted a crank pin 96 which connects through a connecting rod 97 with an operating rod 98 of a stapling mechanism, the upper portion of which is represented generally as S (Figs. 1 and 2). Since this stapling mechanism is old, it is not shown in detail, but it has a hammer 99 (Figs. 21 to 24) which overlies the mandrel and drives a staple D (Fig. 20) through the overlapping ends of the plywood cylindrical shell A'. The shaft 77 also carries an eccentric 100 which operates a connecting rod 101 (Fig. 9) which operates a pawl 102 which is pivotally connected to a plate 103, which is rotatably mounted about a hub 104 adjacent a ratchet wheel 105 which in turn is keyed on the shaft 57. A stop 103ª limits the movement of the pawl with respect to the plate.

Thus on each revolution of the shaft 77 which operates the stapling mechanism, the shaft 57 is rotated a predetermined number of degrees, with the result that the pinion 56 feeds the rack 55 and mandrel 33 forward a predetermined amount so as to position the shell A' for the insertion of the next staple D. As long as the stapling pedal 94 is held down the rotating shaft 77 will continue to insert a staple, advance the mandrel to the next stapling position, insert a staple, etc., until the shaft 32 and mandrel 33 reach the furthermost position to the right, shown in Fig. 22. At the end of each stapling operation the pawl 102 is disengaged. The shell A' is then completed so far as this machine is concerned and must be removed from the mandrel on which it is held by friction. The mechanism for stripping the shell from the mandrel will now be described.

The shaft 57 (Fig. 8) has a sprocket wheel 106 keyed thereto and this is connected through a chain 107 with a sprocket wheel 108 keyed on a shaft 109 which is journaled at one end in a bearing in the frame 31, and at the opposite end in a bracket 110 secured to the base. The shaft 109 has a sprocket 111 journaled thereon and driven by means of a chain 112 from the sprocket wheel 80 on the shaft 77. The hub of the sprocket 111 carries a friction clutch 113, the opposite element of the clutch 114 being keyed to the shaft 109 and carrying a series of operating levers 115 which are adapted to be engaged by a cup-shaped member 116 which is slidably mounted on the shaft 109, and moved back and forth by means of a lever 117 fulcrumed at 118, the opposite end of the lever connecting through a link 119 with a lever 120 on a shaft 121 (Fig. 1) which carries a reversing pedal 122.

As the pedal 122 is depressed the clutch member 114 is pressed against the rotating member 113 and friction causes the shaft 109 to be driven, and this drives the shaft 57 through the sprocket chain 107 and causes the gear 56 (Fig. 10) to be driven in a clockwise direction thereby forcing the shaft 32 and mandrel 33 to the left. If at that time the retaining pawl 69 engages the notch 68 the stripper 63 will remain stationary in the position shown in Fig. 22, while the mandrel is withdrawn to the position shown in Fig. 23. This forces the shell A' almost off the mandrel, so that the operator can readily remove it by hand. To return the stripper to the position shown in Figs. 1 and 24, the operator depresses the lever 71 and forces the stripper back by hand.

In order to support the outer end of the mandrel, particularly during the stapling operation, a foot 123 (Figs. 1 and 13) is provided which is adjustably mounted by means of a screw 124 and nut 125 on the frame 31.

To insure that the mandrel will be in the correct position for inserting the staples D with the groove 47a in the anvil 47 immediately beneath the staple hammer 99, I have provided a longitudinal groove 32b in the shaft 32 (Fig. 12) and a detent 126 is adapted to engage this groove so as to prevent the shaft from rotating. The detent is slidably mounted in a housing 127 carried by the frame 31. A link 128 operably connects this detent with a lever 129 which is keyed on a sleeve 130 rotatably mounted on the shaft 121 and having a releasing pedal 131 keyed thereto. Thus by depressing the pedal 131 the detent 126 is withdrawn at the same time the crank 40 is rotated to form the cylindrical shell.

In Figs. 25 to 31 inclusive is shown a modified form of the machine in which the mandrel instead of being driven by hand is driven by a reversible motor, as will now be described. The mandrel 233 is carried on and driven by a shaft 232 (Fig. 28). This shaft is slidable in a sleeve 301 which has a gear 302 firmly pressed thereon at one end, this sleeve being suitably journaled in a portion of the main frame 231. The gear 302 serves as a guide collar for the sleeve 301, while the opposite end of the sleeve carries a cylindrical collar 303 which is secured thereto by means of a key 304, the latter being held in place by a set screw 305.

The shaft 232 has a keyway 306 in which slides a key 307 which is likewise keyed in the sleeve 301 and in the gear 302, the key having an enlargement at each end so as to retain it in place. This permits the shaft 232 to slide endwise through the sleeve and gear, but to be keyed thereto so as to be rotatable therewith at all times. The gear 302 meshes with a gear 308 which is journaled on a stud 309, the gear 308 also meshing with a pinion 310 which is keyed on a shaft 311 journaled in suitable bearings in the main frame and having keyed thereon one element of a friction drive 312, the opposite element of the friction drive being secured to a gear 313 which is journaled on the shaft 311. The gear 313 meshes with a pinion 314 on a gear reduction 315 which in turn is driven by a reversible motor 316.

Referring to Fig. 26, the shaft 232 has a collar 303 slidably mounted thereon as was previously described, and this has a notch 303a in its face which is adapted to be engaged by a detent 317 which is slidably mounted in guides 318 and movable by means of a bell crank 319 and a rod 320 which in turn is operated by the latch release pedal 222 of Fig. 25. To form a cylindrical shell from a plywood panel A' it is gripped between a gripping plate (Fig. 31) and gripping teeth 242a on levers 242 pivotally mounted in the mandrel on a rod 242b. A toggle joint 242c is pivotally connected at one end to the lever 242, and at the other is mounted on a rotatable rod 242d which extends through the end of the mandrel (Fig. 30) and carries a lever 242e with a handle.

By moving this lever the gripping teeth are set into the plywood panel and firmly hold it, the toggle being moved beyond dead center. The lever 242e is moved back to the dotted line position to release the gripping teeth from the panel. The panel is held gripped during the stapling operation as before and the stapling mechanism is the same as that previously described.

The stripper 263 is similar to the stripper 63 and has two spaced guide rods 264 secured therein by nuts 265 and slidable in suitable guides 266. A latch 269 (Fig. 29) is rotatably mounted on the shaft 232 and is adapted to be rotated by a spring 269a into engagement with notches 267 and 267a on the guide rods 264. Thus the stripper advances with the mandrel and in the extreme outermost position the latch 269 engages the notches 267a and serves to hold the stripper while the mandrel is drawn back through it on reversing the motor 316, thereby stripping the stapled cylindrical shell from the mandrel.

It will be understood that the terms "plywood", "strip" or "panel" as used in the specification and claims are intended to cover any panel of flexible material which is self-supporting and which is capable of being bent around a mandrel, and having its overlapping margins secured together as by riveting or stapling.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. Mechanism for forming a cylindrical container comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally a distance equal to the desired staple spacing, and means for stripping the cylindrical container from the mandrel.

2. Mechanism for forming a cylindrical container comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally in a step by step manner the desired staple spacing, and means for stripping the cylindrical container from the mandrel, the stapling means, advancing means and stripping means being driven by a single source of power.

3. Mechanism for forming a cylindrical container comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally in a step by step manner the desired staple spacing, means for stripping the cylindrical container from the mandrel, and manually controlled means for preventing rotation of the mandrel during the stapling operation but permitting endwise movement of the mandrel.

4. Mechanism for forming a cylindrical container out of a flexible panel having an overlapping metal strip secured to each end comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel a distance equal to the desired staple spacing, a stripper surrounding the mandrel and slidable thereover, means for holding the stripper in an advanced position, and means for withdrawing the mandrel therethrough to strip the container from the mandrel.

5. Mechanism for forming a cylindrical container out of a flexible panel having an overlapping metal strip secured to each end comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel a distance equal to the desired staple spacing, a stripper surrounding the mandrel and slidable thereover, means for holding the stripper in an advanced position, and means for withdrawing the mandrel therethrough to strip the container from the mandrel, the stripper having a shoulder for positioning the panel longitudinally on the mandrel and for forming a bearing which engages the container in the stripping operation.

6. Mechanism for forming a cylindrical container out of a flexible panel having an overlapping metal strip secured to each end comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally a distance equal to the desired staple spacing, a stripper surrounding the mandrel and slidable thereover, means for holding the stripper in an advanced position, and means for withdrawing the mandrel therethrough to strip the container from the mandrel, the stripper having a shoulder for positioning the panel longitudinally on the mandrel and for forming a bearing which engages the container in the stripping operation, the metal strip at one end overlapping the stripper.

7. Mechanism for forming a cylindrical container comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally a distance equal to the desired staple spacing, and means for stripping the cylindrical container from the mandrel, the stripping means being carried by the mandrel and advancing therewith, means for holding the stripping means, and means for withdrawing the mandrel while the stripping means is so held to strip the container from the mandrel.

8. Mechanism for forming a cylindrical container comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally a distance equal to the desired staple spacing, and means for stripping the cylindrical container from the mandrel, the stripping means being carried by the mandrel and advancing therewith sequentially and simultaneously, means for holding the stripping means, and means for withdrawing the mandrel while the stripping means is so held to strip the container from the mandrel.

9. Mechanism for forming a cylindrical container comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally a distance equal to the desired staple spacing, and means for stripping the cylindrical container from the mandrel, the stripping means encircling the mandrel and being carried thereby and advancing therewith, means for holding the stripping means, and means for withdrawing the mandrel while the stripping means is so held to strip the container from the mandrel.

10. Mechanism for forming a cylindrical container comprising a mandrel, means for rotating the mandrel, means carried by the mandrel for gripping one end of a panel, means for winding the panel about the mandrel as the mandrel is turned to form a tube having overlapping ends, means for stapling the overlapping ends, means for advancing the mandrel longitudinally a distance equal to the desired staple spacing, and means for stripping the cylindrical container from the mandrel, the stripping means being carried by the mandrel and advancing therewith, a rod for guiding the stripping means, said rod having a notch corresponding to the outer end of movement of the mandrel, a pawl for engaging the notch to retain the stripping means, and means to withdraw the mandrel through the stripping means to strip the container from the mandrel.

ALBERT H. SCHMIDTKE.